United States Patent [19]

Sonoda

[11] Patent Number: 5,640,263
[45] Date of Patent: Jun. 17, 1997

[54] OPTICAL SCANNER FOR AN IMAGE FORMING APPARATUS

[75] Inventor: Yoshihide Sonoda, Tokyo, Japan

[73] Assignee: Ricoh Company, Ltd., Tokyo, Japan

[21] Appl. No.: 538,613

[22] Filed: Oct. 3, 1995

[30] Foreign Application Priority Data

Oct. 4, 1994 [JP] Japan .................... 6-240196

[51] Int. Cl.⁶ .................................... G02B 26/08
[52] U.S. Cl. ................... 359/196; 359/201; 355/66; 399/202
[58] Field of Search ................. 359/196–197, 359/201, 212, 223, 871, 872; 355/51, 65, 66, 233, 235, 236; 358/474, 487, 494, 497

[56] References Cited

U.S. PATENT DOCUMENTS 4,866,484  9/1989  Murai ......................... 355/235

FOREIGN PATENT DOCUMENTS 62-42389  3/1987  Japan .
2-253274  10/1990  Japan .

*Primary Examiner*—James Phan
*Attorney, Agent, or Firm*—Oblon, Spivak, McClelland, Maier & Neustadt, P.C.

[57] ABSTRACT

In an optical scanner having a plurality of mirrors for scanning a document, a planeness reinforcing member having a predetermined degree of planeness is fitted on major ones of the mirrors. The reinforcing member successfully reduces the vibration of the associated mirror without impairing the planeness of the mirror.

8 Claims, 5 Drawing Sheets

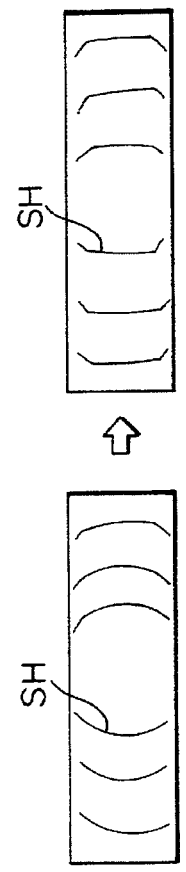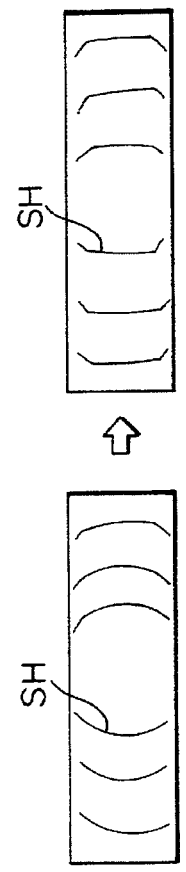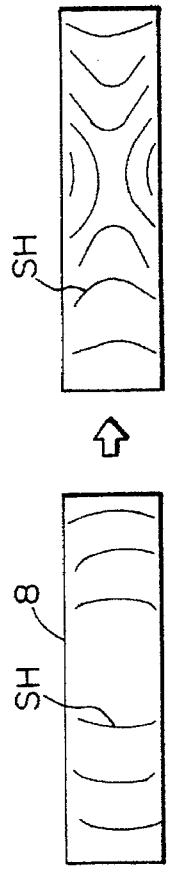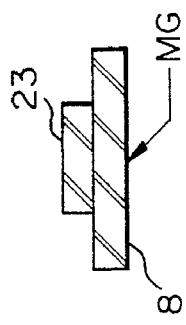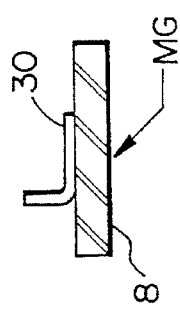

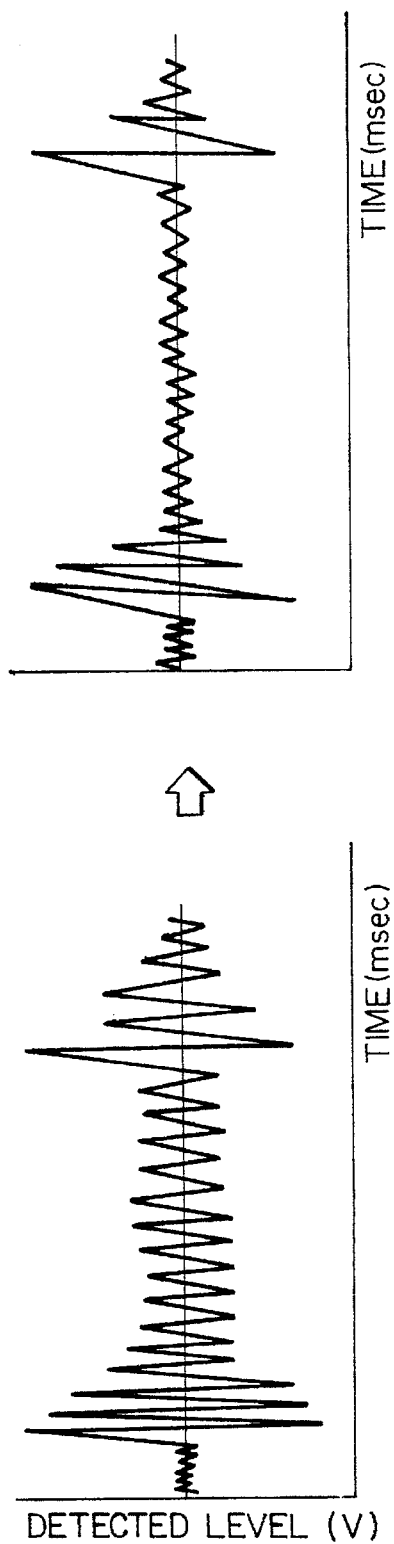
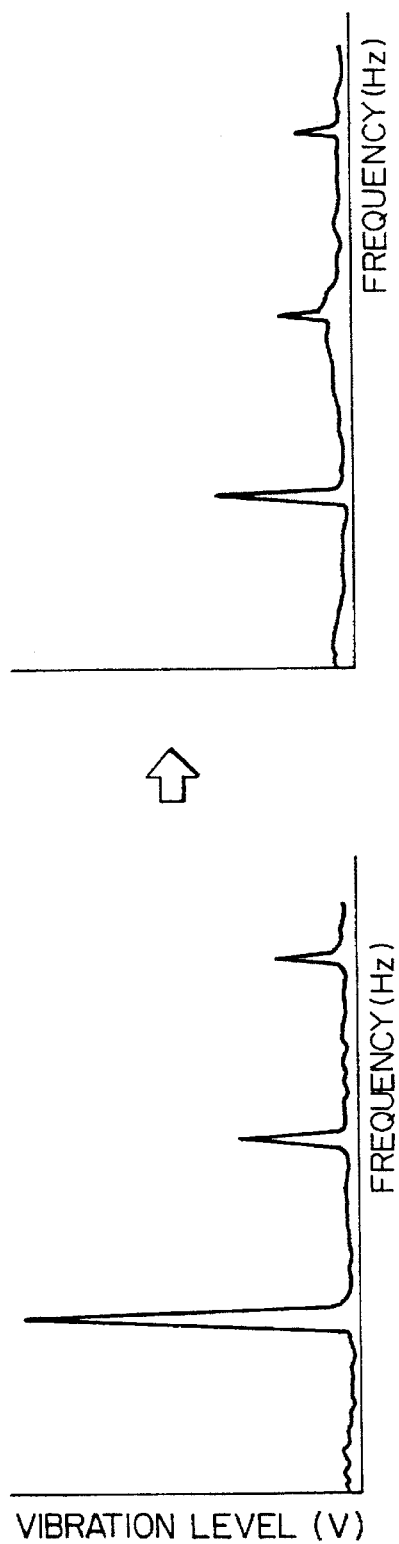

OPTICAL SCANNER FOR AN IMAGE FORMING APPARATUS

BACKGROUND OF THE INVENTION

The present invention relates to an optical scanner for an image forming apparatus.

An optical scanner having a plurality of mirrors for scanning a document is extensively used with image forming apparatuses. The scanner has focusing means therein and is combined with an image forming apparatus having a photoconductive element. The scanner focuses a document image onto the photoconductive element via the focusing means and thereby forms a latent image. The latent image is developed to turn out a corresponding toner image. The toner image is transferred to a paper and then fixed thereon. The scanner forms a part of an analog or digital copier or similar image forming apparatus and includes mirrors which are movable along a document during the course of scanning. A drive source for driving the movable mirrors is implemented by a DC servo motor in a high-speed machine or by a stepping motor in a medium- or low-speed machine. A stepping motor is commonly used because it is advantageous in the cost aspect.

However, the problem with a stepping motor is that it noticeably vibrates and reaches the maximum vibration level at a particular period (frequency). In a copier having a broad range of magnification change ratios, the vibration of the motor causes the mirrors to resonate or even to deform themselves. Various anti-vibration approaches have heretofore been proposed, as follows:

(1) a vibration absorber mounted on a scanning unit and having a variable spring constant (Japanese Patent Laid-Open Publication No. 3-144626);

(2) an anti-vibration member intervening between a mirror and a support frame in order to preserve the planeness of the mirror while protecting it from resonance (Japanese Patent Laid-Open Publication No. 3-180867);

(3) a support member supporting the opposite ends and intermediate portion of a mirror in order to prevent the mirror from vibration (Japanese Patent Laid-Open Publication No. 4-149540);

(4) a lug and a screw respectively supporting the front and the rear of a mirror in order to control vibration (Japanese Patent Laid-Open Publication No. 4-282626);

(5) a rigid member, aluminum material, or zinc-processed steel plate adhered to the rear of a mirror in order to control vibration; and (6) a motor having a heavy output shaft.

However, the above scheme (1) results in a complicated construction. The schemes (2)–(4) each supports only a part of a mirror and, therefore, deteriorates the planeness of the mirror. The scheme (5) adheres a member whose planeness is uncertain to a mirror which needs high planeness. Hence, even the scheme (5) is apt to impair the planeness of the mirror although it may control vibration. Further, the scheme (6), relying on a heavy motor output shaft, increases the torque and, therefore, the size of the machine. This obstructs the miniaturization of the apparatus and cost reduction.

Japanese Patent Laid-Open Publication No. 2-253274 and Japanese Utility Model Laid-Open Publication No. 62-42389 also disclose implementations relating to an optical scanner.

SUMMARY OF THE INVENTION

It is an object of the present invention to provide an optical scanner capable of reducing the vibration of a mirror without impairing the planeness of the mirror.

In accordance with the present invention, in an optical scanner having a plurality of mirrors combined for scanning a document, a planeness reinforcing member having planeness of higher than 100 mR (where mR means meter radius and means the planeness of an arc of a circle having a radius of one meter) is fitted on one side of, among the plurality of mirrors, at least one major mirror which is opposite to the other side facing an optical path.

BRIEF DESCRIPTION OF THE DRAWINGS

The above and other objects, features and advantages of the present invention will become more apparent from the following detailed description taken with the accompanying drawings in which:

FIGS. 6A–6J and 7A–7D are sketches each comparing the present invention and prior art.

DESCRIPTION OF THE PREFERRED EMBODIMENTS

Figure 1:
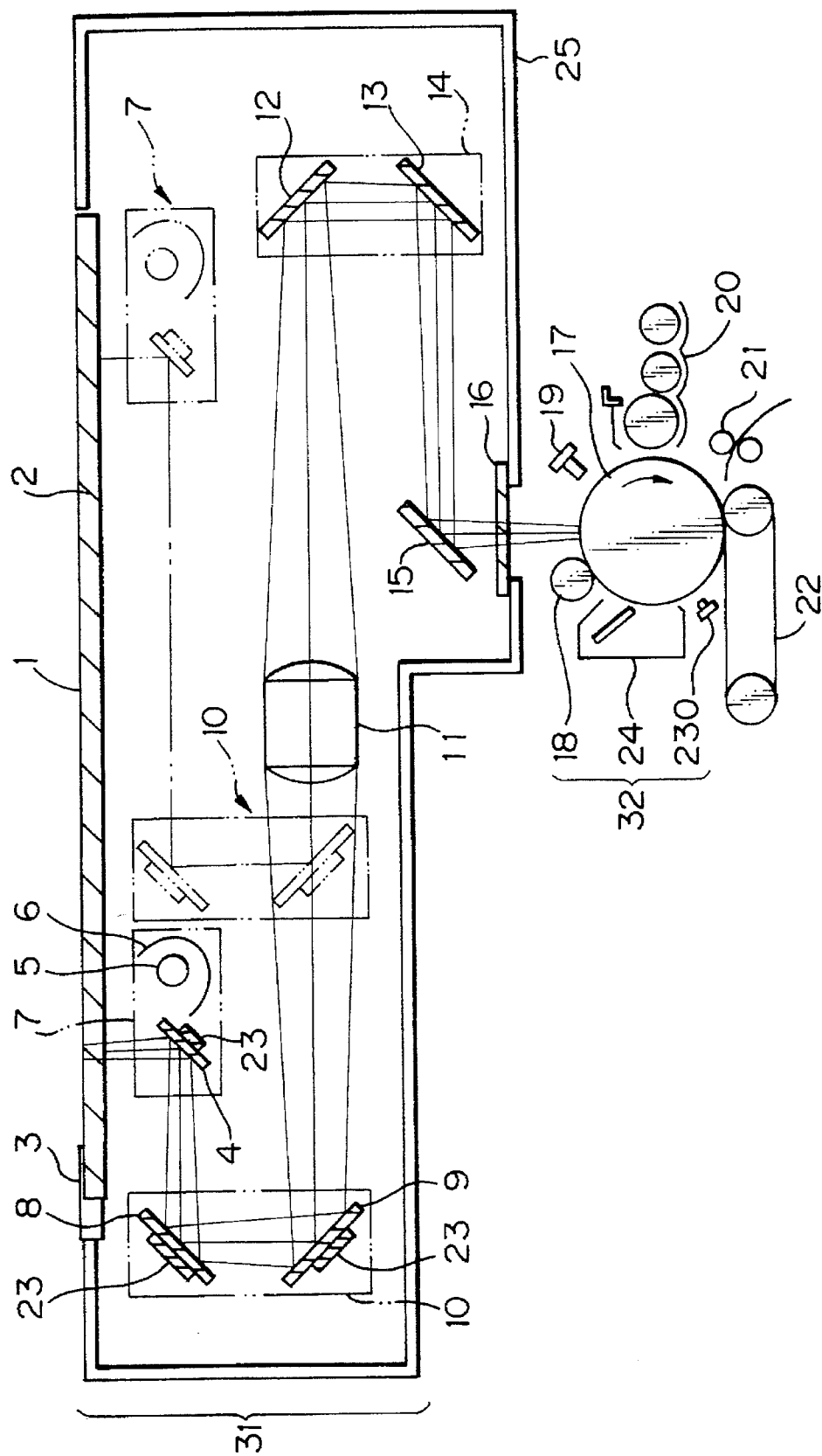
FIG. 1 is a section showing an essential pat of a copier to which the present invention is applicable.

Referring to FIG. 1 of the drawings, a copier to which the present invention is applicable is shown and has a scanning section 31 and an image forming section 32. The scanning section 31 includes a glass platen 2 on which a document 1 is laid. A scale 3 is located at the left edge of the glass platen 2, as viewed in the figure, so that the operator can accurately position the document 1 in the subscanning direction, i.e., the right-and-left direction in the figure. A first mirror 4 and a lamp 5 are disposed below the scale 3. A reflector 6 surrounds the lamp 5 except for a predetermined direction in order to illuminate the document 1. The mirror, lamp 5 and reflector 6 constitute a first scanning unit 7. The scanning unit 7 is bodily movable from a position indicated by solid lines in the figure to a position indicated by dash-and-dots lines, and then from the latter to the former.

Light issuing from the lamp 5 is reflected by the document 1. The imagewise reflection from the document is focused onto a photoconductive drum 17 by way of the first mirror 4, a second mirror 8, a third mirror 9, a lens or focusing means 11, a fourth mirror 12, a fifth mirror 13, a sixth mirror 15, and a transparent plate 16.

The second and third mirrors 8 and 9, respectively, are constructed into a second scanning unit 10. The second scanning unit 10 is movable from a position indicated by solid line to a position indicated by dash-and-dots lines, and then from the latter to the former. The distance which the second scanning unit 10 moves forward or backward is one half the distance which the first scanning unit 7 moves. The scanning unit 10 maintains the length of the optical path extending from the lens 11 to the drum 17 constant during the course of scanning. The mirrors 12 and 13 are affixed to a stationary member included in the copier.

The mirrors 4, 8, 9, 12, 13 and 15 are the mirrors constituting mirror optics as referred to herein. All these mirrors have a rectangular configuration. As shown in FIG. 1, the scanning section 31 including the glass platen 2, mirrors 4–15 and lens 11 are accommodated in a frame 25.

The light from the mirror 15 is incident to the drum 17 via the transparent plate 16. The drum 17 is rotatable in a direction indicated by an arrow in FIG. 1. Arranged around the drum 17 are a charging unit 18, an eraser 19, a developing unit 20, an image transfer belt 22, a potential sensor 23, a cleaning unit 24 and other conventional image processing units. The units 17–24 are sequentially arranged in this order in the direction opposite to the direction of rotation of the drum 17 from a position immediately preceding a position where the light from the mirror 15 is incident to the drum 17. The eraser 19 erases charge existing in needless portions. The potential sensor or potential sensing means senses the surface potential of the drum 17. The cleaning unit 24 removes toner left on the drum 17 after image transfer.

A latent image electrostatically formed on the drum 17 is developed by the developing unit 20 to turn out a toner image. The image transfer belt 22 is pressed against the drum 17 at an image transfer position. When a paper is fed from a registration roller 21 to the image transfer position, the toner image is transferred from the drum 17 to the paper. Then, the paper is conveyed to a fixing unit, not shown, to have the toner image fixed thereon.

The operator inputs desired copying conditions on switches arranged on an operation panel, not shown, mounted on the copier, and then presses a print button, not shown. In response, the copying cycle described above begins.

Figure 2:
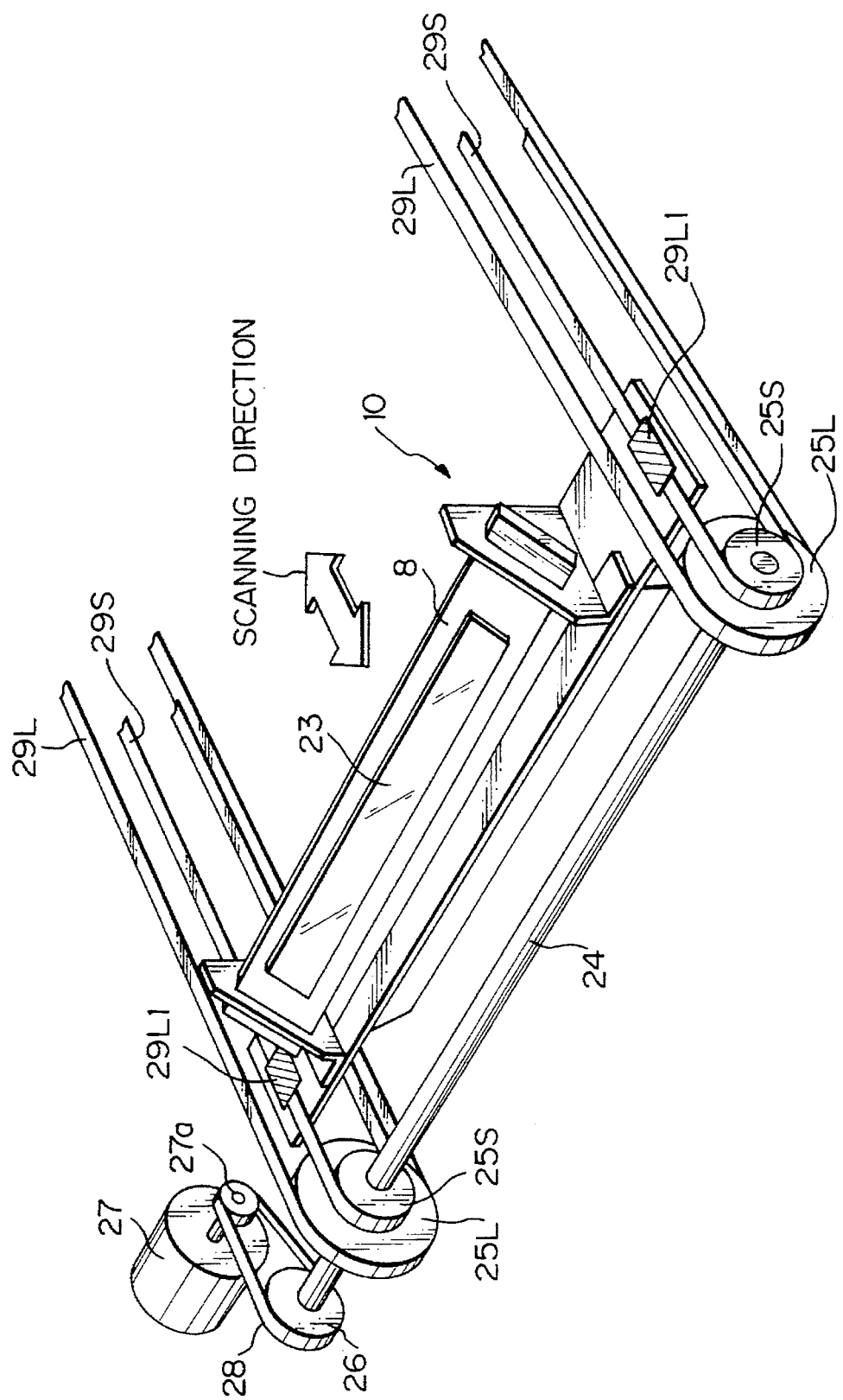
FIG. 2 is a perspective view of a second scanning unit included in the copier and a mechanism for driving it.

FIG. 2 shows a mechanism for driving the first and second scanning units 7 and 10. As shown, the mechanism has a stepping motor 27 having an output shaft on which a pulley 27a is mounted. A belt 28 is passed over the pulley 27a and a pulley 26 mounted on a drive shaft 24. Also mounted on the drive shaft 24 are a pulley 25L having a larger diameter and a pulley 25S having a smaller diameter. The diameter of the pulley 25S is one half of the diameter of the pulley 25L. A timing belt 29L is passed over the pulley 25L and a pulley, not shown, facing and identical in diameter with the pulley 25L. Likewise, a timing belt 29S is passed over the pulley 25S and a pulley, not shown, facing and identical in diameter with the pulley 25S. The pulleys 25L and 25S, pulleys facing them, and timing belts 29L and 29S are also arranged on the other side of the drive shaft 24 opposite to the motor 27. The second scanning unit 10 is affixed to the timing belts 29S at positions 29L1. In this configuration, the stepping motor 27 drives the scanning system 10 via the pulley 27a, belt 28, pulley 26, drive shaft 24, and pulleys 25S.

The first scanning unit 7 is affixed to the timing belts 29L, although not shown in FIG. 2. The stepping motor 27 drives the scanning unit 7 via the pulley 27a, belt 28, pulley 26, drive shaft 24, and pulleys 25L. Because the scanning unit 7 moves together with the timing belts 29L passed over the pulleys 25L, the distance which it moves back and forth is double the distance which the other scanning unit 10 moves.

The stepping motor 27 generates vibration. The vibration is transferred to the mirrors included in the first and second scanning units 7 and 10 via the above torque transmission paths. The resulting vibration of the mirrors adversely affects image data being scanned. An implementation for preserving the planeness of the mirrors while controlling the vibration will be described hereinafter.

Referring again to FIG. 1, a planeness reinforcing member 23 is fitted on the rear of each of the mirrors 4, 8 and 9 which is opposite to the front facing the respective optical path. The reinforcing member 23 is implemented as a rigid plate. Preferably, the reinforcing member 23 is made of glass because glass is rigid and can be easily machined for accurate planeness. The reinforcing member 23 functions to suppress the vibration and to protect the associated mirror from deformation. Hence, planeness of higher than 100 mR (where mR means meter radius and means the planeness of an arc of a circle having a radius of one meter) is required.

Figure 3:
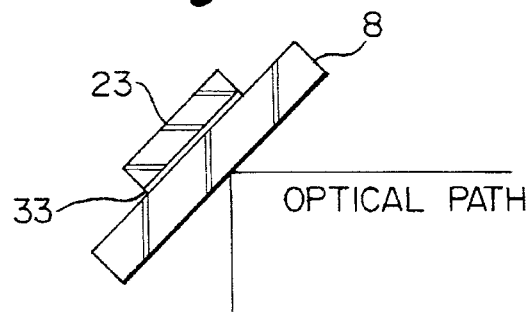
FIG. 3 is a section of a mirror and a planeness reinforcing member representative of an embodiment of the present invention.

FIG. 3 shows how the reinforcing member 23 is fitted specifically, taking the second mirror 8 as an example. As shown, fitting means is implemented as a two-sided adhesive tape 33 which is less than 1 mm thick. The adhesive tape 33 may be replaced with adhesive, if desired. This kind of fitting means is similarly applicable to the other mirrors.

In FIG. 1, the mirror closer to the lens 11 on the optical path for scanning has more critical influence on the accuracy of an image to be focused onto the drum 17. Hence, the prerequisite is that the reinforcing member 23 be fitted on the mirror close to the lens 11, i.e., the third mirror 9 in FIG. 1. The fourth mirror 12 is fixed in place and, therefore, does not need the reinforcing member 23 except when it is susceptible to vibration from any other section of the copier.

For the same reason, among the mirrors whose optical paths contain the lens or focusing means 11, the mirror closer to the focusing means is provided with the reinforcing member 23 having a higher degree of planeness.

Figure 4:
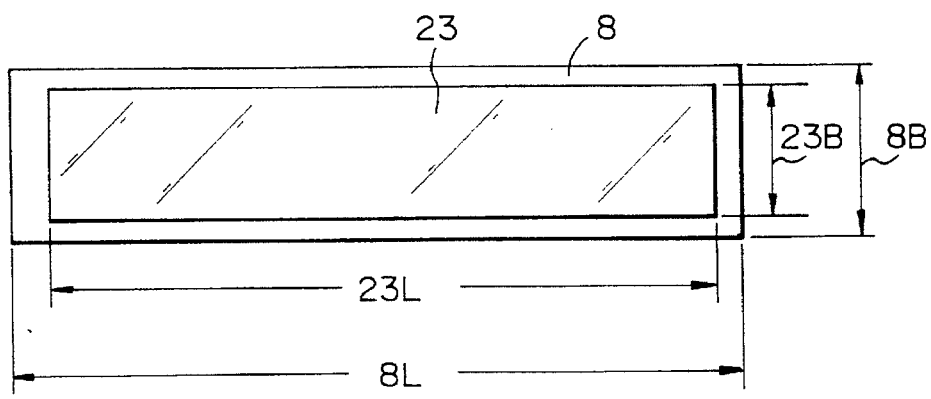
FIG. 4 is a front view showing a specific dimensional relation between the mirror and the planeness reinforcing member in accordance with the present invention.

As shown in FIG. 4, the second mirror 8, for example, has a rectangular configuration. The reinforcing member 23 fitted on the mirror 8 has a longitudinal dimension 23L which is greater than one half of the lengthwise dimension 8 of the mirror 8. The lateral dimension 23B of the reinforcing member 23 is greater than one-third of the lateral dimension 8B of the mirror 8. This dimensional relation between the reinforcing member 23 and the mirror 8 is necessary in order to achieve the vibration control function and to preserve the planeness of the mirror, as known by experience.

Figure 5:
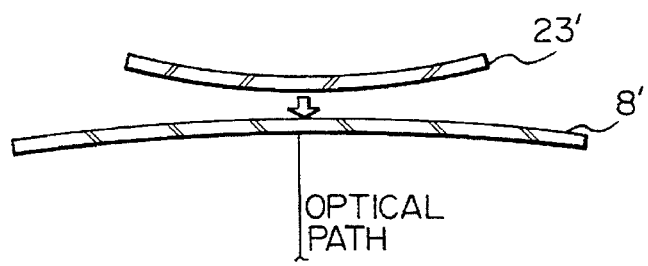
FIG. 5 is a section showing an alternative embodiment of the present invention.
Figure 5:
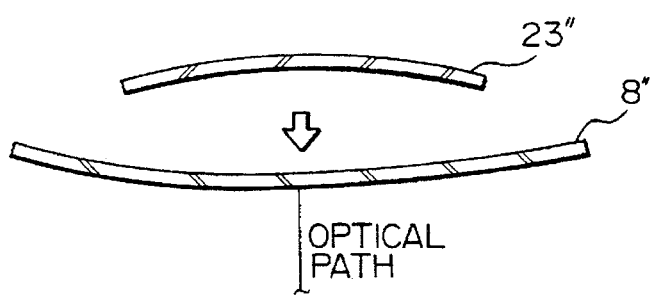

When the mirror is concave on the optical path in the lengthwise direction thereof, the reinforcing member 23 is provided with a convex configuration, and vice versa. Specifically, FIG. 5 shows mirrors 8' and 8" neighboring each other. The mirror 8' is concave downward in its lengthwise direction (right-and-left direction in FIG. 5). On the other hand, the mirror 8" is convex downward in the lengthwise direction. A reinforcing member 23' convex downwrd is fitted on the mirror 8' while a reinforcing member 23" concave downward is fitted on the mirror 8".

When the mirror 8' or 8" and the reinforcing member 23' or 23" repulsing each other in respect of planeness are adhered to each other, their directionalities cancel each other. As a result, the mirror 8' or 8" with the reinforcing member 23' or 23" has higher accuracy than when provided alone. This is because the planeness of the mirror changes complementarily to the planeness of the reinforcing member with the lapse of time and eventually has its configuration corrected. In the specific arrangement of FIG. 5, the mirrors 8' and 8" are opposite to each other as to the convex-concave tendency and respectively provided with the reinforcing members 23' and 23" opposite in tendency to the mirrors 8' and 8". This not only corrects the planeness of the individual mirrors, but also maintains the distance between the nearby mirrors constant. In this condition, an optical image routed through these mirrors are incident to the drum 17 without any distortion.

In another specific arrangement relating to FIG. 5, the mirrors 8' and 8" may be respectively concave and convex downward while the reinforcing members 23' and 23" may also be respectively concave and convex downward. This relation is also successful to correct the planeness of each mirror with the elapse of time. In addition, in the entire optics including such mirrors, the tendencies of the mirrors cancel each other, so that a desirable focusing ability is achievable.

Referring to FIGS. 6A–6J, how the accuracy of a mirror changes as to planeness will be described. FIGS. 6G and 6H are sketches representative of the planeness of the second mirror 8. As shown in FIG. 6H, the mirror 8 has a downward convex tendency as seen from the side. As shown in FIG. 6G, contour lines SH obtained by an interferometer also indicate such a tendency of the mirror 8. FIG. 6F shows a conventional anti-vibration member 30 whose planeness is not controlled at all. When the anti-vibration member 30 is fitted on the mirror 8, the planeness of the mirror 8 varies as shown in FIGS. 6I and 6J. As shown in FIG. 6J, the mirror 8 becomes convex downward in tendency, as shown in FIG. 6I, the contour lines SH of the mirror 8 are irregular. In this condition, the mirror 8 with the anti-vibration member 30 is lower in accuracy than when provided alone, although it may be capable of reducing vibration. FIG. 6A shows the mirror 8 on which the reinforcing member 23 is fitted. The mirror 8 remains in substantially the same condition both when it is not provided with the reinforcing member 23, as shown in FIGS. 6B and 6C, and when it is provided with the member 23, as shown in FIGS. 6D and 6E. The mirror 8, therefore, maintains the accuracy particular thereto even when the reinforcing member 23 is fitted thereon.

A reference will be made to FIGS. 7A–7D for describing a vibration control effect. For experiment, the second scanning unit 10 was provided with the second mirror 8 lacking an anti-vibration member and was mounted on the first scanning unit 7. The scanning unit 10 was moved from its home position to the end of the stroke over the document reading range. FIG. 7A shows vibration levels acted on the mirror 8 in terms of voltage. FIG. 7B shows vibration levels acted on the mirror 8 when the reinforcing member (made of glass) 23 was mounted on the mirror 8. The comparison between FIGS. 7A and 7B indicates that the reinforcing member 23 lowers the vibration level at the intermediate portion of the stroke, i.e., in the document scanning range. FIG. 7C shows a relation between the vibration level and the frequency and determined with the mirror 8 lacking an anti-vibration member. FIG. 7D is similar to FIG. 7C, but it shows a relation determined with the mirror 8 provided with the reinforcing member (made of glass) 23. By comparing FIGS. 7C and 7D, it will be seen that the present invention is capable of reducing vibration with respect to particular frequencies.

In summary, it will be seen that the present invention provides an optical scanner for an image forming apparatus and capable of controlling the vibration of mirrors without impairing the planeness thereof.

Various modifications will become possible for those skilled in the art after receiving the teachings of the present disclosure without departing from the scope thereof.

What is claimed is:

1. An optical scanner for scanning a document comprising:

a light source for providing light to said document;

a plurality of mirrors arranged to form an optical path for receiving light from said document; and a planeness reinforcing member connected to at least one of said plurality of mirrors on the side opposite the optical path to prevent vibration from disturbing the planeness of the mirror to which it is connected, said planeness reinforcing member having a planeness of higher than 100 mR.

2. A scanner as claimed in claim 1, wherein said planeness reinforcing member comprises a member made of glass.

3. A scanner as claimed in claim 1, wherein said at least one of said plurality of mirrors is positioned close to focusing means on said optical path.

4. A scanner as claimed in claim 1, wherein said at least one of said plurality of mirrors and said planeness reinforcing member each has a rectangular configuration, and wherein said planeness reinforcing member has a longitudinal dimension and a lateral dimension which are respectively greater than one half of a longitudinal dimension of said at least one of said plurality of mirrors and greater than one-third of a lateral dimension of said at least one of said plurality of mirrors.

5. A scanner as claimed in claim 1, wherein means for fitting said planeness reinforcing member on said at least one of said plurality of mirrors comprises adhesive.

6. A scanner as claimed in claim 1, wherein means for fitting said planeness reinforcing member comprises a two-sided adhesive tape having a thickness of less than 1 mm.

7. A scanner as claimed in claim 1, wherein when said planeness reinforcing member is fitted on at least two of said plurality of mirrors, the planeness of said planeness reinforcing member is higher on the mirror closer to focusing means located on said optical path than on the other mirror.

8. A scanner as claimed in claim 1, wherein said planeness reinforcing member has a convex fitting surface when said at least one of said plurality of mirrors is concave on said optical path in a longitudinal direction of said at least one of said plurality of mirrors, or has a concave fitting surface when said at least one of said plurality of mirrors is convex in said longitudinal direction.

* * * * *